Feb. 15, 1949.　　　M. H. ALLDREDGE　　　2,461,866
JOINT
Filed Dec. 6, 1944
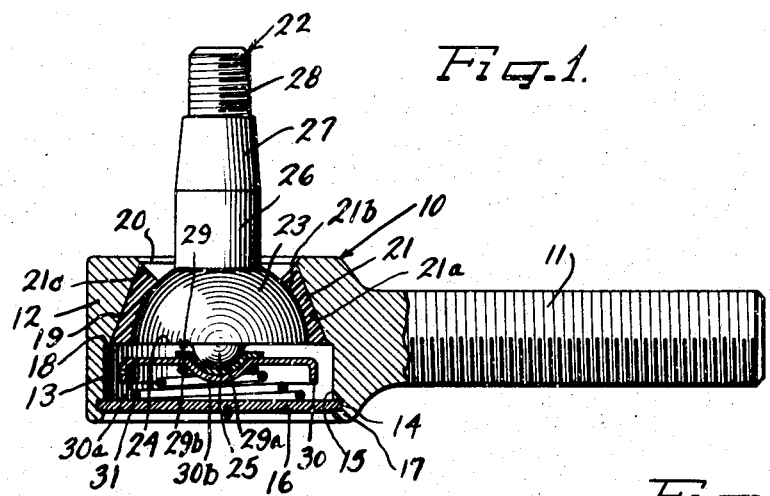
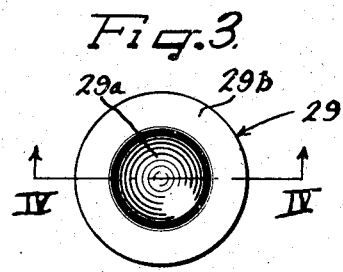
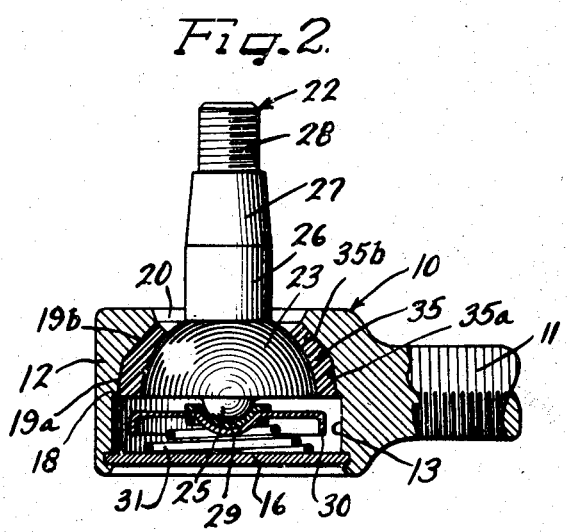
Inventor
MARSHALL HOMER ALLDREDGE Patented Feb. 15, 1949

2,461,866

UNITED STATES PATENT OFFICE 2,461,866

JOINT

Marshall Homer Alldredge, Detroit, Mich., assignor to Thompson Products, Inc., Cleveland, Ohio, a corporation of Ohio Application December 6, 1944, Serial No. 566,913

4 Claims. (Cl. 287—90)

This invention relates to socket assemblies or joints which do not require lubrication, and which will have a long operating life without the aid of lubricant.

Specifically the invention relates to tie rod joints which do not require grease or other lubricant, and which will continue to function efficiently and quietly without lubricant.

According to the invention, the tie rod socket is provided with an inside wall accommodating thrust loads and converging to a reduced-diameter opening. A molded plastic material seat is mounted in the socket on the converging thrust wall and has a wedge-like engagement therewith to prevent rotation between the seat and socket. The seat defines a bearing surface accommodating rotating and tilting movements. The stud has an enlarged head mounted in said seat in tiltable and rotatable relationship therewith. A spring-urged retainer is mounted in the socket and has a wear plate composed of molded plastic material thereon acting on the stud to transmit the force of the spring to a stud head for maintaining the stud head in good bearing relationship with the seat.

A feature of the invention resides in the provision of a one-piece molded plastic seat for tie rod joints or the like joints accommodating universal movement between operating parts. This molded seat is so formed that it is merely dropped into position in a housing such as a tie rod socket. The outer wall of the seat is of a wedge-like contour to have good wedging engagement with the socket so that the seat will not rotate in the socket.

It is, then, an object of the present invention to provide joints accommodating limited universal movement between operative parts with a molded plastic material seat wedged in one of the parts and having greaseless bearing relationship with the other of the parts.

A specific object of the invention is to provide a tie rod joint with a molded plastic material seat interposed between a metal stud and a metal socket and having friction engagement with the socket but good bearing relation with the stud to accommodate tilting and rotating movements of the stud without the aid of lubricant.

A still further object of the invention is to provide a molded plastic composition seat ring for tie rod studs which can be merely dropped into a forged or coined metal tie rod socket and presents in said socket a finished greaseless bearing surface for the tie rod joint.

Other and further objects of the invention will be apparent to those skilled in the art from the following detailed description of the annexed sheet of drawings which, by way of preferred examples only, illustrates two embodiments of the invention.

On the drawings:

Figure 1 is a side elevational view, with parts broken away and shown in vertical cross section, of one form of tie rod joint according to this invention.

Figure 2 is a fragmentary side elevational view, with parts broken away and shown in vertical cross section, of another form of tie rod joint according to this invention.

Figure 3 is a plan view of the molded plastic material wear plate used in the joints of Figures 1 and 2.

Figure 4 is a transverse cross-sectional view taken along the line IV—IV of Figure 3.

As shown on the drawings:

In Figure 1 the reference numeral 10 designates a tie rod end socket or housing having an externally threaded laterally projecting stem 11 for insertion into a tie rod (not shown). The socket 10 has an enlarged end portion 12 defining a cylindrical chamber 13 extending inwardly from a counterbore 14 which provides a shoulder 15 adjacent one end of the housing. A closure disk 16 is seated in this counterbore 14 and is bottomed on the shoulder 15. The closure disk 16 is held in position against the shoulder 15 by a spun-over portion 17 of the housing.

The other end of the cylindrical chamber 13 terminates in a shoulder 18. A tapered wall 19 extends from the shoulder 18 to a reduced-diameter opening 20 in the end of the housing 12 remote from the closure disk 16. The wall 19 is thus frusto-conical and preferably defines a wedging angle.

The housing 12 is readily formed by forging and coining operations on metal. The surfaces of the housing interior and exterior need not be finished, and can have relatively wide tolerance limits.

A frusto-conical seat ring 21 composed of molded synthetic plastic material is dropped into the large open end of the housing and seated on the frusto-conical wall 19 thereof. The seat 21 converges from the shoulder 18 to the opening 20 of the housing and its frusto-conical external wall 21 is in wedging engagement with the frusto-conical wall 19 of the socket. The seat 21 defines a segmental spherical inner bearing wall 21b. This bearing wall converges from the shoulder 18 to the opening 20 and to increase the tilting range of the stud member for the joint the converging end of the seat can be beveled outwardly as at 21c.

The seat 21 can be composed of any suitable bearing material that does not require grease or other lubricant, and that will not squeak when a metal bearing member is moved thereon. Molded plastic material is quite suitable.

The joint has a stud 22 with a half-ball end 23 seated on the bearing wall 21b of the seat 21. The ball end 23 has the major diameter thereof terminating in a flat end face 24 and a rounded button end 25 projects from the central portion of this flat end face 24.

The small end of the half-ball 23 terminates in a projecting cylindrical shank portion 26 which extends through the reduced opening 20 of the socket and terminates in a frusto-conical or tapered portion 27. The small end of the tapered portion 27 of the shank terminates in a small diameter threaded cylindrical end 28.

The button end 25 of the stud is seated in the fragmental spherical depression 29a of a plastic or other non-metallic wear plate 29. This wear plate 29 has a flat rim 29b surrounding the depression 29a.

A metal retainer 30 is disposed in the chamber 13 of the housing 12 and has a flat top wall 30a with a segmental spherical depression or dimple 30b in the central portion thereof receiving the portion 29a of the wear plate. The rim 29b of the wear plate is seated on the flat face 30a of the retainer around the dimple 30b.

A tapered coil spring 31 has the large end coil thereof bottomed on the closure disk 16 while the small opposite end coil thereof surrounds the dimple 30b and urges the retainer 30 to carry the wear plate 29 against the button 25 for moving the stud toward the reduced opening 20 and thereby maintaining the bearing surface of the stud head 23 in good bearing relationship with the bearing wall 21b of the seat member 21.

The joint of Figure 1 therefore includes a metal stud with a head tiltable and rotatable on a molded plastic seat ring that is frictionally retained by a metal socket. A spring-urged retainer in the socket carries a molded plastic material wear plate that acts on a projection of the stud head to transmit spring force to the stud head for maintaining it in good bearing engagement on the seat. The wear plate accommodates tilting and rotating movements of the head. The stud is thus insulated from contact with metal by the plastic seat 21 and the plastic wear plate 29.

In the embodiment of the invention shown in Figure 2, the same reference numerals used in Figure 1 designate identical parts.

In the modification of Figure 2, the converging wall 19 of Figure 1 is divided into two converging wall portions 19a and 19b. The portion 19a extends from the shoulder 18 at a slight angle of taper but it merges with a more acutely tapered wall portion 19b. This wall portion 19b is continued to the aperture 20.

A seat ring 35 is provided in place of the ring 21, and this ring 35 has a bottom tapered outer wall portion 35a seating on the wall portion 19a together with a top beveled or tapered portion 35b seated on the wall 19b. This arrangement of relatively tapered side walls 35a and 35b for the seat ring provides more material for a thrust surface of the seat ring.

The seat ring can have wedging engagement with the socket walls 19a and 19b and will not move in the socket. The stud will tilt and rotate in the seat ring as described in connection with Figure 1.

From the above descriptions it will be understood that this invention provides an inexpensive, greaseless tie rod joint wherein a metal housing part can be roughly forged, coined or machined within wide tolerance limits to receive in wedged frictional engagement therewith a molded plastic seat ring and the seat ring, in turn, provides a smooth wear-resisting bearing surface for the tie rod joint stud. No grease or other lubricant is necessary, and the metal of the joint stud is kept out of engagement with the metal of the socket by the interposed plastic seat ring, as well as by an interposed plastic wear plate.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A tie rod joint comprising a metal socket having a frusto-conical inner wall, a plastic material bearing ring in wedging engagement with said frusto-conical inner wall of the socket, said bearing ring defining a seat in the socket accommodating tilting and rotating movements, a stud having a head in said seat in tiltable and rotatable relationship therewith, said head having a rounded button end thereon, a molded plastic wear plate having a depression receiving said projection of the stud, and a spring urged metal retainer in said socket having a depression receiving the projection of the wear plate, said spring-urged retainer acting through said wear plate on said stud for maintaining the stud in good bearing relation with the plastic seat.

2. A tie rod joint comprising a metal socket having a pair of adjacent tapered inner wall portions in angular relation but converging in the same direction, a molded plastic material seat ring having a pair of adjacent tapered outer wall portions in wedged engagement with said pair of tapered inner wall portions, said seat ring having a segmental spherical inner bearing wall providing a seat, a stud having a fragmental spherical head tiltable and rotatable on said seat of the seat ring, and a spring-urged molded plastic wear plate acting on said stud to maintain the stud head in good bearing relation with the seat ring.

3. A tie rod type joint comprising a socket member having a tapered wall converging to an opening and defining a wedging angle, a plastic material seat ring in said socket member having a tapered outer wall mating with the tapered wall of the socket member and forced into wedge lock engagement therewith, said seat ring defining an internal bearing wall accommodating tilting movements and converging toward an opening adjacent the socket opening, a stud member having a shank extending freely through the openings of the socket member and the seat ring and having a head portion in bearing engagement with the inner wall of the seat ring, and resilient means in said socket member acting on said stud for urging the stud head against the inner wall of the seat ring.

4. A tie rod type joint comprising a metal socket having a tapered inner wall converging toward an opening, a molded plastic material seat ring having a mating tapering wall in wedge lock engagement with the inner wall of the socket member, said seat ring having an inner bearing wall converging toward the opening of the socket member and shaped to accommodate tilting and rotating movements, a stud having a head tiltable and rotatable on said inner bearing wall of the said ring together with a shank projecting freely through the openings of the bearing ring and socket member, and a spring-urged molded plastic wear plate acting on said stud to maintain the stud head in good bearing relation with the seat ring.

MARSHALL HOMER ALLDREDGE.

REFERENCES CITED

The following references are of record in the file of this patent:

UNITED STATES PATENTS

| Number | Name | Date |
| --- | --- | --- |
| 1,918,394 | Hufferd et al. | July 18, 1933 |
| 2,009,401 | Hufferd et al. | July 30, 1935 |
| 2,325,845 | Flumerfelt | Aug. 3, 1943 |
| 2,398,848 | Newey | Apr. 23, 1946 |

FOREIGN PATENTS

| Number | Country | Date |
| --- | --- | --- |
| 845,561 | France | May 15, 1939 |
| 582,421 | Germany | Aug. 15, 1933 |